Figure 1:
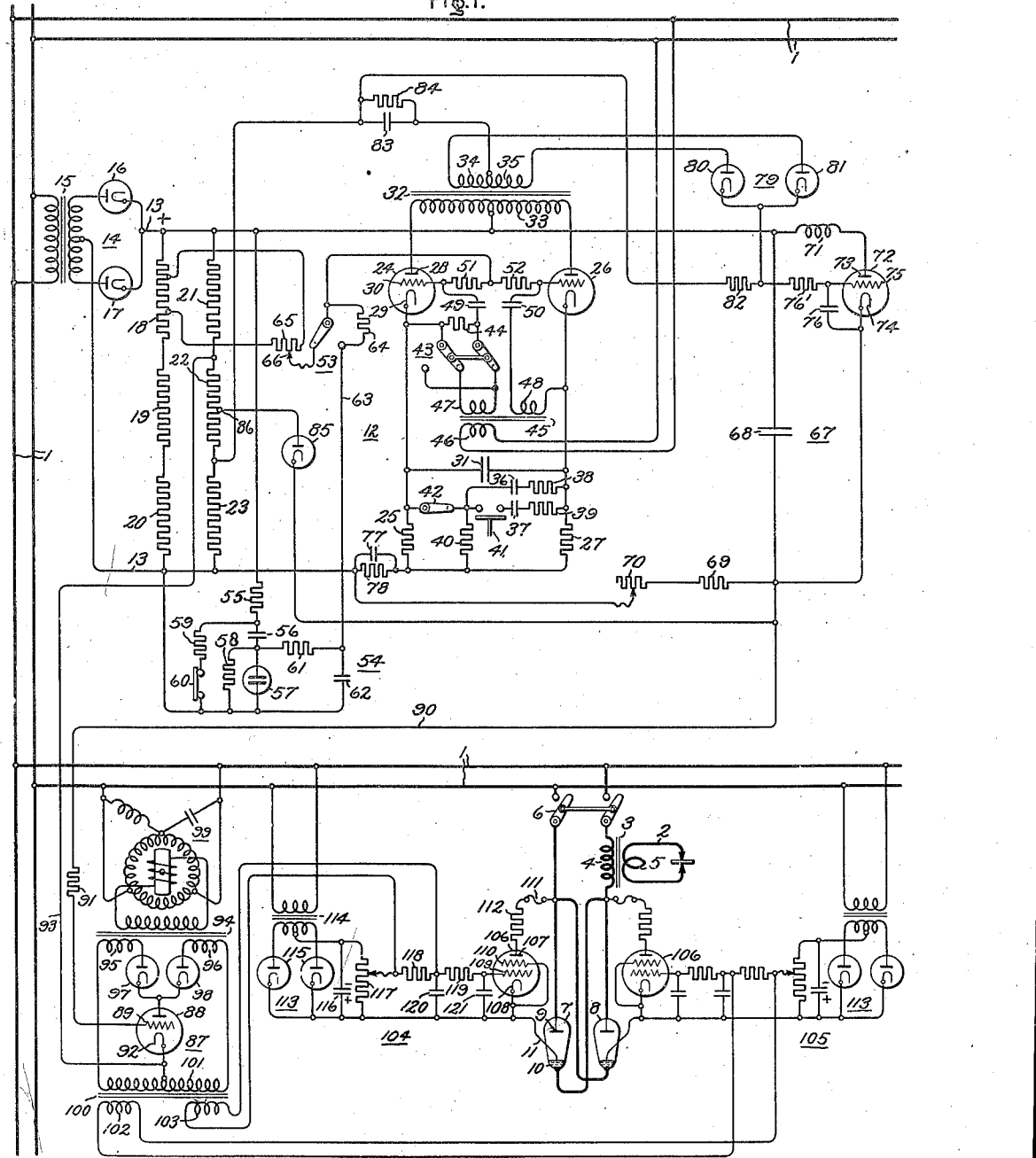

Patented July 18, 1939

2,166,306

UNITED STATES PATENT OFFICE 2,166,306

ELECTRIC VALVE CIRCUIT

Louis G. Levoy, Jr., Ballston Lake, N. Y., assignor to General Electric Company, a corporation of New York Application June 2, 1937, Serial No. 146,021

12 Claims. (Cl. 250—27)

My invention relates to electric translating apparatus and more particularly to control circuits for electric valve translating apparatus.

Heretofore there have been devised numerous circuits for controlling the operation of electric valve translating apparatus to effect periodic or intermittent energization of a load circuit from an alternating current supply circuit. Many of these arrangements have employed electric valve circuits for generating periodic electrical quantities, such as voltages or currents, to control the periodicity of the energization of the load circuit and these arrangements have also been employed to control the amount of energy transmitted to the load circuit during each period of energization and for controlling the ratio of the intervals of conduction to the intervals of nonconduction. However, in these prior art arrangements there has been evidenced considerable difficulty in effecting the desired flexibility of control of the periodicity of the energizations without sacrificing the highly desirable precision of control of the ratio of the intervals of conduction to the intervals of nonconduction. For example, in electric welding circuits where it is desirable to provide periodic energizations of the welding circuit, it is also desirable to provide control circuits in which the amount of energy transmitted to the load circuit and the ratio of the intervals of conduction to the intervals of nonconduction are accurately and precisely determinable and controllable. Moreover, in electric valve control circuits for electric valve translating apparatus it is important to provide arrangements whereby the control circuits furnish voltages which are precisely and sharply defined to attain accurate control of the main or power electric valve apparatus.

It is an object of my invention to provide a new and improved electric valve translating circuit.

It is another object of my invention to provide a new and improved control system for electric valve translating apparatus.

It is a further object of my invention to provide a new and improved electric valve circuit for controlling an electric valve translating apparatus to effect periodic or intermittent energization of an associated load circuit whereby the ratio of the intervals of conduction to the intervals of nonconduction is precisely and accurately controllable.

It is a still further object of my invention to provide a new and improved electric valve control circuit for main or power electric valve apparatus in which the control voltage therefor is maintained within a certain range of values and whereby the control voltage is of predetermined wave form.

In accordance with the illustrated embodiment of my invention, I provide an electric valve control system for controlling electric valve apparatus to transmit energy from an alternating current supply circuit to an alternating-current load circuit, such as a welding circuit. The system controls the conductivities of main or power electric valves of the translating apparatus, whereby periodic or intermittent energization of the load circuit may be effected or whereby the load circuit may be energized during an accurately determinable interval of time in accordance with a predetermined single circuit controlling operation. More particularly, the control system includes an electric valve circuit for generating an electrical impulse, or a train of electrical impulses, to determine the periodicity of the energization of the load circuit. The electric valve control system also includes an independent second circuit for generating the voltage which controls the period of the energization of the load circuit, and the amount of energy transmitted thereto, or when the system is operating to effect intermittent or periodic energization of the load circuit the second circuit controls the amount of energy transmitted to the load circuit and controls the ratio of the intervals of conduction to the intervals of nonconduction of the main or power electric valves. The second circuit includes a capacitance which is charged from a source of direct current and also includes an electric valve having a control member for periodically discharging the capacitance to generate the periodic control voltage. I provide an excitation circuit interposed between the first circuit and the second circuit for effecting the desired energization of the control member of the electric valve, and this excitation circuit comprises a voltage divider which is connected across the direct current source and which impresses on the control member a negative unidirectional biasing potential tending to maintain the electric valve in a nonconducting condition. The excitation circuit also includes an inductive means, such as a transformer, for introducing in the excitation circuit a voltage in response to the periodic electrical quantity generated by the first circuit. A unidirectional conducting device or a pair of unidirectional conducting devices and a serially connected impedance element, such as a resistance, are connected in series relation with the transformer and impress on the control member positive unidirectional impulses of voltage sufficient to render ineffective the biasing potential and thereby render the electric valve conductive. I also connect in series relation with the impedance element and the unidirectional conducting device a parallel connected resistance and a capacitance to control the wave form of the positive impulses impressed on the control member, thereby accurately defining the positive impulses to afford a precise arrangement for controlling the electric valve. I also provide in series relation with the first circuit a parallel connected capacitance and a resistance which establish a second negative unidirectional biasing potential which assists the biasing potential supplied by the voltage divider, providing thereby an arrangement for assuring positive operation of the electric valve control system.

Another feature of my invention concerns a circuit for controlling the above discussed periodic control voltage so that the wave forms thereof are uniform or symmetrical. The circuit includes a unidirectional conducting device which is connected between one terminal of the capacitance and a point on the voltage divider to control the maximum value of the voltage of the capacitance.

Figure 2:
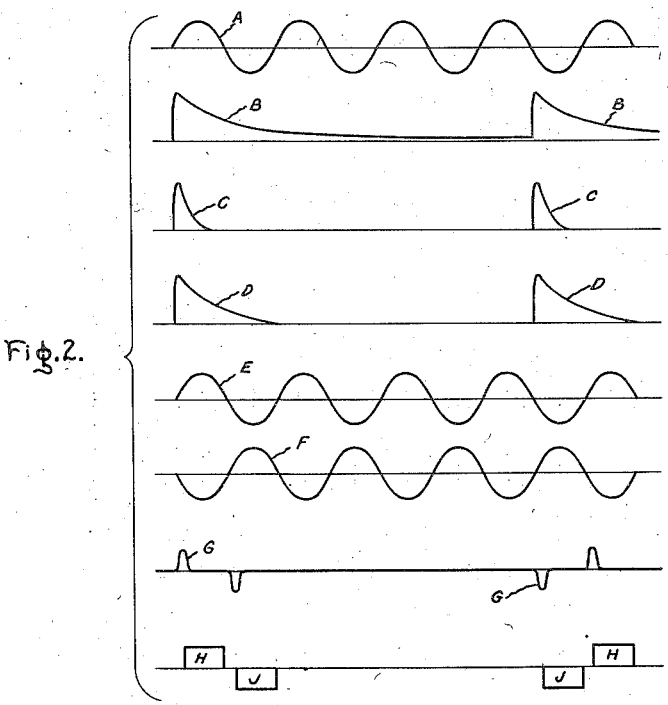

For a better understanding of my invention, reference may be had to the following description taken in connection with the accompanying drawings and its scope will be pointed out in the appended claims. Fig. 1 of the accompanying drawings diagrammatically shows an embodiment of my invention as applied to an electric valve translating system for energizing a welding circuit; and Fig. 2 represents certain operating characteristics thereof.

In Fig. 1 of the accompanying drawings my invention is shown diagrammatically as applied to an electric valve translating system for transmitting energy from an alternating current supply circuit 1 to a load circuit, such as a welding circuit 2, through a transformer 3 having a primary winding 4 and a secondary winding 5. A suitable circuit controlling means, such as a switch 6, may be interposed between the supply circuit 1 and transformer 3. A pair of oppositely connected main or power electric valves 7 and 8 are connected in series relation with the primary winding 4 of transformer 3 and serve to control the impedance of the winding 4 and to control thereby the current transmitted to the welding circuit 2. The electric valves 7 and 8 are preferably of the type employing an ionizable medium, such as a gas or a vapor, and in the particular arrangement illustrated in the drawings these valves are shown as being of the type employing an anode 9, a mercury pool cathode 10 and a control member 11 of the immersion-igniter type.

To control the energization of the members 11 of electric valves 7 and 8 and to control the periodicity of the energization of load circuit 2 from supply circuit 1, I employ a circuit 12 which generates periodic electrical impulses or generates a predetermined number of periodic electrical impulses in response to a single circuit controlling operation. Certain features of the circuit 12 are disclosed and broadly claimed in a copending application of Harold W. Lord, Serial No. 146,019 filed concurrently herewith and assigned to the assignee of the present application. The circuit 12 includes a source of direct current 13. The source of direct current 13 may be supplied by any suitable arrangement such as a bi-phase rectifier 14 including a transformer 15, which is connected to the alternating current circuit 1, and a pair of unidirectional conducting devices 16 and 17. The circuit 12 also includes a voltage divider including serially-connected resistances 18, 19 and 20 which are connected across the source of direct current 13, and includes a second voltage divider including resistances 21, 22 and 23 which are connected in series relation across the direct current source 13. A pair of parallel electric paths are connected to be energized from the direct current source 13; one of these paths includes electric valve 24 and a serially-connected impedance element 25 and the other parallel path includes electric valve 26 and a serially-connected impedance element 27. The electric valves 24 and 26 are preferably of the type employing an ionizable medium, such as a gas or a vapor, and each includes an anode 28, a cathode 29 and a control member 30. A capacitance 31 is connected across the parallel paths and is arranged to be charged alternately in opposite directions through electric valves 24 and 26 from the direct current source 13. An inductive device, such as a transformer 32 having a primary winding 33 connected in the anode-cathode circuits of electric valves 24 and 26 is employed to supply alternating voltages in response to the electrical impulses generated in the circuit 12 due to the charging of the capacitance 31. The transformer 32 is also provided with a secondary winding 34 having an intermediate connection 35.

Suitable impedance means including capacitances 36 and 37, resistances 38, 39 and 40 and circuit controlling means, such as a switch 41, may be connected in the circuit 12 to control the period of the electrical impulses generated by circuit 12. A switch 42 may be connected in the circuit to provide additional flexibility in the control of the periodicity of the electrical impulses generated by this circuit.

As a means for controlling the circuit 12 to generate electrical impulses of which consecutive impulses occur during half cycles of voltage of opposite polarity of the supply circuit 1 or during half cycles of voltage of a predetermined polarity of the circuit 1, I employ an excitation circuit including a suitable circuit controlling means, such as a reversing switch 43, which impresses on control members 30 of electric valves 24 and 26 alternating voltages displaced 180 electrical degrees or inphase alternating voltages. The switch 43 is preferably of the snap acting type biased to the left-hand position and to the right-hand position. An impedance 44 of relatively large value is connected across switch 43 to serve as a means for preventing the control members 30 of electric valves 24 and 26 from floating during switching operations. The excitation circuit also includes a transformer 45 having a primary winding 46 and secondary windings 47 and 48 which supply the alternating voltages for energizing control members 30 of electric valves 24 and 26. Primary winding 46 is connected to alternating current circuit 1. The voltage supplied by the secondary winding 47 is impressed across cathode 29 and control member 30 of electric valve 24 through a circuit including a capacitance 49, and the voltage supplied by secondary winding 48 is impressed across cathode 29 and control member 30 of electric valve 26 through a circuit including capacitance 50. A pair of serially connected resistances 51 and 52 are employed to impress on control members 30 of electric valves 24 and 26 a unidirectional negative biasing potential to be discussed hereinafter.

As an agency for selectively energizing the control members 30 of electric valves 24 and 26 of control circuit 12 to generate intermittent or periodic electrical impulses or to cause circuit 12 to generate only a predetermined number of electrical impulses, I employ a suitable circuit controlling means, such as a switch 53. When the switch 53 is in the left-hand position the circuit is connected to generate a train of periodic electrical impulses, and when the switch is in the right-hand position the excitation circuit for electric valves 24 and 26 is connected to a circuit 54 which modifies the negative unidirectional biasing potential impressed on control members 30 to permit these valves to generate only a predetermined number of electrical impulses, or only one electrical impulse. Certain features of the control system including the electric circuit 54 are disclosed and broadly claimed in the above mentioned copending application of Harold W. Lord. The circuit 54 includes a serially connected resistance 55, a capacitance 56 and a glow discharge valve 57 which are connected across the direct current source 13. An impedance element, such as a resistance 58 of relatively large value, is connected across the glow discharge valve 57 and serves as a means for impressing across the terminals thereof a relatively large transient voltage to render the valve conductive when a parallel circuit including a resistance 59 and a circuit controlling device, such as a switch 60, is opened. The circuit including the resistance 59 and switch 60 is connected across the serially connected capacitance 56 and the glow discharge valve 57. A voltage divider, including a serial connected resistance 61 and a capacitance 62, is responsive to the voltage of the valve 57, and is connected across electric valve 57 to supply a negative unidirectional biasing potential which is a predetermined component of the voltage appearing across the electric valve 57. This component of voltage is transmitted to the switch 53 for electric valves 24 and 26 through a conductor 63. An impedance 64 of relatively large value is connected in series relation with the conductor 63 and the excitation circuit for electric valves 24 and 26 and serves to render ineffective circuit 54 when the switch 53 is in the left-hand position. When the switch 53 is in the right-hand position, the impedance 64 is effectively short circuited to permit the circuit 54 to exert its control on circuit 12. As a means for adjusting the resultant negative unidirectional biasing potential impressed on control members 30 of electric valves 24 and 26, I employ a voltage divider including a resistance 65 having an adjustable tap 66 which is energized in accordance with the voltage appearing across a predetermined portion of resistance 18.

A circuit 67 is employed to generate a periodic voltage or an impulse of voltage which controls the amount of energy transmitted to the load circuit 2 during each period of energization thereof, or which may be employed to control the ratio of the intervals of conduction to the intervals of nonconduction of the electric valves 7 and 8 during periodic energization of the load circuit 2, or which may be employed to control the duration of the period of energization of the load circuit 2 when the system operates to effect only one interval of energization thereof. The circuit 67 includes a capacitance 68 which is connected to be charged from the direct current source 13 through a serially connected resistance 69 and an adjustable impedance element such as an adjustable resistance 70. To discharge the capacitance 68 in response to the electrical impulses generated by circuit 12, I provide a serially connected inductance 71 and an electric valve 72 which are connected across capacitance 68. The electric valve 72 includes an anode 73, a cathode 74 and a control member 75 and is preferably of the type employing an ionizable medium such as a gas or a vapor. A capacitance 76 may be connected across the control member 75 and cathode 74 to absorb extraneous transient voltages and a current limiting resistance 76' may be connected in series relation with the control member 75.

This arrangement employing two separate and independent circuits for controlling the periodicity of the energization of the load circuit 2 and the ratio of the intervals of conduction to the intervals of nonconduction of electric valves 7 and 8 is disclosed and broadly claimed in a copending patent application of Louis G. Levoy, Jr. and George W. Garman, Serial No. 146,020, filed concurrently herewith and assigned to the assignee of the present application.

A parallel connected capacitance 77 and a resistance 78 are connected in series with the two parallel paths of circuit 12 to supply a negative unidirectional biasing potential which assists the negative unidirectional biasing potential supplied by the voltage divider including resistances 21, 22 and 23.

I provide an excitation circuit for energizing control member 75 of electric valve 72 to render the electric valve conductive at predetermined selected times. The excitation circuit includes a portion of the voltage divider comprising resistances 21, 22 and 23 and impresses on control member 75 of electric valve 72 a negative unidirectional biasing potential tending to maintain electric valve 72 nonconducting. The excitation circuit also includes a rectifier 79 energized in accordance with the voltage variations of secondary winding 34 of transformer 32 and may include a pair of unidirectional conducting devices, such as electric valves 80 and 81, connected for full wave rectification, which transmit impulses of unidirectional current to a serially connected impedance element, such as a resistance 82. The positive unidirectional impulses of voltage due to the transmission of current through resistance 82, which are impressed on control member 75 of electric valve 72, are sufficient in magnitude to overcome the biasing potential to render the electric valve conductive. I connect in series relation with the resistance 82 and electric valves 80 and 81 a parallel connected capacitance 83 and resistance 84 to control the wave form of positive unidirectional impulses of voltage impressed on control member 75. The capacitance 83 transmits only the peaks of this voltage to control member 75, affording thereby a precise and positive controlling arrangement.

To control the circuit 67 so that the impulses of periodic voltage generated thereby are of symmetrical wave form and of the same magnitude, I provide a unidirectional conducting device, such as an electric valve 85, connected between a suitable point such as point 86 of resistance 22 and the common juncture of capacitance 68 and cathode 74 of electric valve 72. The electric valve 85 limits the maximum voltage to which the capacitance 68 is subjected by the direct current source 13.

The voltage generated by circuit 67 is employed to control the conductivities of electric valves 7 and 8. A circuit 87 including an electric valve 88 controls the energization of immersion-igniter control members 11 of electric valves 7 and 8. Electric valve 88 is provided with a control member 89 and is preferably of the type employing an ionizable medium such as a gas or a vapor. The voltage generated by the circuit 67 is impressed on control member 89 of electric valve 88 through a circuit including a conductor 90 and a serially connected resistance 91. A cathode 92 of electric valve 88 is connected to the common juncture of resistances 21 and 22 through a conductor 93. The circuit 87 is disclosed and broadly claimed in a copending application of Harold W. Lord, Serial No. 138,809, filed April 24, 1937, and assigned to the assignee of the present application. The circuit 87 controls electric valves 106 to energize control members 11 of electric valves 7 and 8, and includes a transformer 94 having secondary windings 95 and 96 and unidirectional conducting devices 97 and 98 which rectify the alternating voltages of peaked wave form generated by transformer 94. Transformer 94 is preferably of the saturable type designed to generate alternating voltages of peaked wave form and may be energized from the alternating current circuit 1 through any conventional phase shifting arrangement such as the rotary phase shifter 99. Electric valve 88 in conjunction with the unidirectional conducting devices 97 and 98 energizes primary winding 101 of transformer 100 in opposite directions to induce alternating voltages of peaked wave form in secondary windings 102 and 103, which in turn energize excitation circuits 104 and 105 associated with electric valves 7 and 8, respectively. The voltages impressed on control members 11 of electric valves 7 and 8 may be controlled by adjusting phase shifter 99 to effect control of the amount of energy transmitted to the load circuit 2 during each half cycle of voltage applied to electric valves 7 and 8 during the periods of conduction thereof.

Each of the excitation circuits 104 and 105 includes an electric valve 106 which is energized in accordance with the voltage appearing across the anode 9 and the cathode 10 of the associated main electric valve and comprises an ancde 107, a cathode 108, a control member, such as a grid 109, and a screen grid 110. The screen grid 110 may be connected to the cathode or to any potential less positive then that of the anode 107. Electric valves 106 are preferably of the type employing an ionizable medium, such as a gas or a vapor, and to serve as a protective means for these electric valves I employ a suitable current limiting arrangement such as a fuse 111 and a serially connected resistance 112. To impress on the grids 109 of electric valves 106 negative unidirectional biasing potentials, I employ any conventional arrangement such as rectifiers 113 each including a transformer 114, unidirectional conducting devices 115, a capacitance 116 connected across the output of the rectifier and a resistance voltage divider 117. A predetermined component of the output voltage of the respective rectifiers 113 is impressed on the associated grid 109 through a circuit including serially connected resistances 118 and 119. A capacitance 120 is connected in each of the excitation circuits 104 and 105 and serves to absorb or filter extraneous transient voltages induced in windings 102 and 103 of transformer 100 when electric valves 106 become nonconductive. The capacitances 120 also serve to prevent the transfer of extraneous transient voltages from excitation circuits 104 and 105 to transformer 100. When electric valve 106 in either excitation circuit 104 or 105 becomes nonconductive, there is impressed in the associated excitation circuit through the associated grid 109 a voltage of steep wave front which, were it not for the presence of capacitance 120, would be reflected to the transformer 100 and hence to the other excitation circuit. A capacitance 121 is connected across grid 109 and cathode 108 to absorb extraneous transient voltages. The voltages of peaked wave form generated by windings 102 and 103 of transformer 100 are impressed across the terminals of resistances 118 in excitation circuits 105 and 104, respectively, and are of a magnitude sufficient to overcome the negative unidirectional biasing potentials to render electric valves 106 conductive at the proper times.

The operation of the embodiment of my invention diagrammatically shown in Fig. 1 of the accompanying drawings will be explained when the system is operating to effect periodic energization of the load circuit 2. The switch 6, of course, is moved to the closed circuit position and the electric valves 7 and 8 operate to control the voltage impressed upon primary winding 4 of transformer 3 to control the energization of circuit 2.

Let it be assumed that it is desirable to energize the load circuit 2 periodically and that it is desirable to initiate consecutive energizations thereof during half cycles of voltage of opposite polarity of the alternating current circuit 1. To effect this result the switch 43 of circuit 12 is moved to the right-hand position so that the voltages impressed on control members 30 of electric valves 24 and 26 are displaced 180 electrical degrees. The manner in which this circuit operates to effect this type of control is explained in detail in the above mentioned copending patent application of Harold W. Lord, Serial No. 146,019. Furthermore, let it be assumed that the switch 53 is in the position shown in the drawings so that the circuit 12 generates a train of electrical impulses of predetermined periodicity. The periods of these impulses are determined primarily by the value of the capacitance 31 impedances 25 and 27, and the number of the impedances, including capacitances 36 and 37 and resistances 38 and 39, which are connected in the circuit 12. The circuit 12 will generate the periodic electrical impulses due to the alternate charging of capacitance 31 from the direct current source 13 through electric valves 24 and 26, and the anode currents transmitted by these electric valves will induce an alternating voltage in the secondary winding 34 of transformer 32. The alternating current output of secondary winding 34 is rectified by the rectifier 79 and impresses unidirectional impulses of voltage on control member 75 of electric valve 72 to render electric valve 72 conductive in accordance with the periodicity established by circuit 12.

The excitation circuit for electric valve 72 impresses on control member 75 thereof sharply defined unidirectional positive impulses of voltage to precisely control the electric valve. Rectifier 79 functions in the well known manner to effect full wave rectification of the output voltage of the secondary winding 34 of transformer 32 and transmits current through the serially connected resistance 82. Due to the connection of the parallel connected capacitance 83 and resistance 84 in the circuit, the wave form of the current transmitted through the resistance 82 will be substantially peaked so that the impulses of voltage impressed on control member 75 are also of peaked wave form. The resistance 84 permits the discharge of the capacitance 83 to permit the passage of subsequent impulses of current and to avoid thereby blocking of the excitation circuit.

It is to be noted that parallel connected capacitance 77 and resistance 78, which are connected in series relation with the parallel paths of circuit 12, serve to supply a second negative unidirectional biasing potential to assist that obtained through the voltage divider including resistances 21, 22 and 23. This arrangement affords a more precise and positive control of the system.

Unidirectional conducting device 85, which is connected between point 86 of resistance 82 and the common juncture of capacitance 68 and electric valve 72, limits the voltage to which the capacitance 68 is subjected by the direct current source 13. In this manner the impulses of periodic control voltage supplied by circuit 67 are maintained at a substantially uniform value to assure continuous and smooth control of the circuit 87.

Circuit 67 operates to generate a periodic control voltage of a predetermined period in response to the electrical impulses generated by the circuit 12. Capacitance 68, which is charged from the direct current source 13, is periodically discharged through the circuit including inductance 71 and electric valve 72, and the period of the periodic voltage generated by circuit 67 may be controlled by adjusting resistance 70. The periodic voltage generated by circuit 67 is impressed across control member 89 and cathode 92 of electric valve 88 in circuit 87, and renders electric valve 88 conductive for a predetermined time to permit the transmission of a predetermined number of impulses of voltage of peaked wave form, which in turn render electric valves 7 and 8 conductive for a corresponding interval of time.

The operation of the arrangement of my invention shown in Fig. 1 may be better understood by considering the operating characteristics represented in Fig. 2 where curve A represents the alternating voltage of supply circuit 1, and curve B represents the periodic electrical quantities generated by circuit 12 which determine the periodicity of the energization of load circuit 2. Curves C represent the positive unidirectional impulses of voltage impressed on control member 75 of electric valve 72. Curve D represents the periodic control voltage generated by circuit 67 and which renders electric valve 88 in circuit 87 conductive for a predetermined number of half cycles of voltage of circuit 1. Curves E and F represent the alternating voltages impressed across anodes 9 and cathode 10 of electric valves 7 and 8, respectively, and curves G represents the alternating voltages of peaked wave form generated in secondary windings 102 and 103 of transformer 100 and which are impressed on grids 109 of electric valve 106 to render electric valves 7 and 8 conductive. Spaces H represent the current in the load circuit 2 due to conduction of current by electric valve 7, and spaces J represent the current in the load circuit 2 due to the conduction of current by electric valve 8. The spaces H and J represent the current transmitted to the load circuit 2 when the circuit 87 is adjusted to control the amount of energy transferred to the load circuit 2 during the half cycles of energization of the load circuit 2. It is to be noted that although the period of electrical impulses generated by circuit 12 as represented by curve B is relatively large, the periodic control voltage generated by circuit 67, as represented by curve D, is relatively small so that the interval of energization of the load circuit 2 is accurately determinable, and the ratio of the intervals of conduction to the intervals of nonconduction is also accurately determinable and controllable. As an additional matter, it is to be noted that the consecutive energizations of the load circuit 2 are initiated during half cycles of voltage of opposite polarity of the alternating current circuit 1.

If it is desired to effect only one period of energization of the load circuit 2 in response to a single circuit controlling operation, the switch 53 may be moved to the right-hand position to connect effectively circuit 54 to the system. The circuit 54 then impresses on control members 30 of electric valves 24 and 26, through resistances 51 or 52, 64, 61 and 58, a negative potential sufficient to render ineffective the alternating voltages generated by transformer 45. When the switch 60 is moved to the open circuit position, the negative unidirectional biasing potential impressed on control members 30 of electric valves 24 and 26 is temporarily decreased to permit the alternating voltages generated by transformer 45 to render electric valve 24 or 26 conductive. The switch 60 is normally maintained in the closed circuit position and when in that position the negative biasing potential supplied by circuit 54 is of sufficient magnitude to render ineffective the voltage supplied by transformer 45. Upon closing the switch 60 after an initiating operation, the circuit 54 is restored to its initial condition permitting a repetition of the above described sequence of operation. The operation of circuit 54 is more fully explained in the above identified copending application of Harold W. Lord, Serial No. 138,809.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric valve translating apparatus connected between said circuits for effecting periodic energization of said load circuit, an electric valve circuit for generating a periodic electrical quantity to control the periodicity of the energization of said load circuit, a second circuit comprising a source of direct current, a capacitance and an electric valve responsive to said electrical quantity for generating a periodic voltage to control the ratio of the intervals of conduction to the intervals of nonconduction of said electric valve translating apparatus, said electric valve having a control member for controlling the conductivity thereof, an excitation circuit for said control member comprising a voltage divider connected across said source for impressing on said control member a negative unidirectional biasing potential, means for impressing on said control member positive unidirectional voltage impulses sufficient in magnitude to overcome said biasing potential to render said electric valve conductive comprising a serially connected unidirectional conducting device and an impedance element and means connected in series relation with said unidirectional conducting device and said impedance element for controlling the wave shape of said impulses, means connected in series relation with said electric valve circuit comprising a parallel connected resistance and capacitance for supplying a second negative unidirectional biasing potential to assist said first mentioned biasing potential, and means for controlling the magnitude of said periodic voltage.

2. In combination, an alternating current supply circuit, a load circuit, electric valve translating apparatus connected between said circuits for effecting periodic energization of said load circuit, an electric valve circuit for generating a periodic electrical quantity to control the periodicity of the energization of said load circuit, a circuit comprising a source of direct current, a capacitance connected to be charged from said source and an electric valve having a control member for periodically discharging said capacitance to generate a periodic voltage to control the ratio of the intervals of conduction to the intervals of nonconduction of said electric valve translating apparatus, an excitation circuit for said control member comprising a voltage divider connected across said source for impressing on said control member a negative unidirectional biasing potential, means responsive to said periodic electrical quantity for impressing on said control member positive unidirectional voltage impulses comprising a serially connected unidirectional conducting device and an impedance element and means connected in series relation with said unidirectional conducting device and said impedance element for controlling the wave shape of said impulses, and means comprising a parallel connected resistance and a capacitance connected in shunt relation with said electric valve circuit to establish a second negative unidirectional biasing potential to assist said first mentioned negative unidirectional biasing potential.

3. In combination, an alternating current supply circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve having a control member for generating a periodic voltage to control the ratio of the intervals of conduction to the intervals of nonconduction of said electric valve translating apparatus, and an excitation circuit for energizing said control member comprising a voltage divider connected across said source of direct current for impressing on said control member a negative unidirectional biasing potential, means responsive to said periodic electrical quantity for impressing on said control member positive unidirectional voltage impulses sufficient in magnitude to overcome said biasing potential and including a serially connected unidirectional conducting device and an impedance element and means connected in series relation with said impedance element and said unidirectional conducting device for controlling the wave shape of said impulses.

4. In combination, an alternating current supply circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve responsive to said electrical quantity for generating a periodic voltage to control the ratio of the intervals of conduction to the intervals of nonconduction of said electric valve translating apparatus, and means comprising a unidirectional conducting device for controlling the magnitude of said periodic voltage.

5. In combination, an alternating current supply circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve responsive to said electrical quantity for generating a periodic voltage to control the ratio of the intervals of conduction to the intervals of nonconduction of said electric valve translating apparatus, and means comprising a unidirectional conducting device to limit the voltage of said capacitance and an impedance element connected in series relation with said capacitance to control the wave form of said periodic voltage.

6. In combination, an alternating current supply circuit, a load circuit, electric valve translating apparatus connected between said circuits for effecting periodic energizations of said load circuit, a circuit for generating a periodic electrical quantity to control the periodicity of the energization of said load circuit, a circuit comprising a source of direct current, a capacitance connected to be charged from said source of direct current and an electric valve means responsive to said electrical quantity for periodically discharging said capacitance to generate a periodic voltage to control the ratio of the intervals of conduction to the intervals of nonconduction of said electric valve translating apparatus, and means comprising a voltage divider connected across said source of direct current and a unidirectional conducting device connected between a point on said voltage divider and said capacitance for limiting the voltage of said capacitance.

7. In combination, an alternating current circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve having a control member for generating a periodic voltage to control the ratio of the intervals of conduction to the intervals of nonconduction of said electric valve translating apparatus, and an excitation circuit comprising means responsive to said electrical quantity and a unidirectional conducting device for supplying positive unidirectional voltage impulses and means for controlling the wave shape of said positive voltage impulses.

8. In combination, an alternating current supply circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve having a control member for generating a periodic voltage to control the length of the intervals of conduction of said electric valve translating apparatus, and a circuit for energizing said control member comprising means responsive to said electrical quantity and a serially connected full wave rectifier, a resistance and a capacitance to impress on said control member positive impulses of peaked voltage to render said electric valve conductive.

9. In combination, an alternating current supply circuit, a load circuit, electric valve translating apparatus connected between said circuits for effecting periodic energization of said load circuit, a circuit for generating a periodic electrical quantity to control the periodicity of the energization of said load circuit, a circuit comprising a source of direct current, a capacitance and an electric valve having a control member for generating a periodic voltage to control the ratio of the intervals of conduction to the intervals of nonconduction of said electric valve translating apparatus, and an excitation circuit for energizing said control member comprising means responsive to said electrical quantity, a unidirectional conducting device energized by said means for providing unidirectional voltages to render said electric valve conductive and a reactive element connected in series relation with said means and said unidirectional conducting device to impress on said control member only a predetermined portion of the output voltage of said unidirectional conducting device.

10. In combination, an alternating current circuit, a load circuit, a plurality of electric valve means connected between said circuits for transmitting energy therebetween and each including an anode, a cathode and a control member, a plurality of control circuits each including a control electric valve having a control grid and being connected across said anode and said control member for energizing said control member, a source of negative unidirectional biasing potential, a resistance connected in series relation with said grid, a transformer having a plurality of secondary windings each connected across a resistance in a different one of said circuits for introducing in the associated circuit a voltage to overcome the biasing potential to render the associated control electric valve conductive, and means for filtering the voltage impressed on said grid through said resistance to suppress voltage transients introduced through said transformer when a control electric valve in another of said control circuits becomes nonconductive.

11. In combination, an alternating current circuit, a load circuit, a plurality of electric valve means each having an anode, a cathode and a control member for transmitting energy between said circuits, a transformer having a plurality of secondary windings, and a plurality of excitation circuits each including a control electric valve having a grid and being connected across said anode and said control member, a source of direct current, a resistance connected in series relation with said grid, a voltage divider connected across said source for impressing a negative biasing potential on said grid through said resistance, each of said secondary windings being connected across a resistance in a different one of the excitation circuits to introduce therein a voltage sufficient to overcome the biasing potential to render the associated control electric valve conductive, and a filter circuit comprising a capacitance and a portion of said voltage divider.

12. In combination, an alternating current circuit, a load circuit, a plurality of electric valve means interposed between said circuits for transmitting energy therebetween and each including an anode, a cathode and a control member, a transformer having a plurality of secondary windings, and a plurality of excitation circuits each associated with a different one of said electric valve means comprising a control electric valve having a grid and being connected across said anode and said control member, a source of direct current, a pair of serially connected resistances connected to said grid, a voltage divider including a resistance connected across said source for impressing on said grid through said serially connected resistances a negative unidirectional biasing potential, each of said secondary windings being connected across one of said serially connected resistances in a different one of said excitation circuits to introduce therein a voltage sufficient to overcome said biasing potential to render the associated control electric valve conductive, and a filter circuit comprising a capacitance connected between said control member and the common juncture of said serially connected resistances for suppressing voltage transients.

LOUIS G. LEVOY, Jr.